(12) United States Patent
Lee et al.

(10) Patent No.: US 8,706,973 B2
(45) Date of Patent: Apr. 22, 2014

(54) UNBOUNDED TRANSACTIONAL MEMORY SYSTEM AND METHOD

(75) Inventors: Jaejin Lee, Seoul (KR); Jong-Deok Choi, Seongnam-si (KR); Seung-Mo Cho, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 496 days.

(21) Appl. No.: 12/964,128

(22) Filed: Dec. 9, 2010

(65) Prior Publication Data

US 2011/0167222 A1 Jul. 7, 2011

(30) Foreign Application Priority Data

Jan. 5, 2010 (KR) .......................... 10-2010-000614

(51) Int. Cl.
*G06F 12/00* (2006.01)

(52) U.S. Cl.
USPC .......................................................... 711/144

(58) Field of Classification Search
None
See application file for complete search history.

(56) References Cited

U.S. PATENT DOCUMENTS

| | | | |
|---|---|---|---|
| 7,206,818 B2 | 4/2007 | Okochi et al. | |
| 7,237,068 B2 | 6/2007 | Wallin et al. | |
| 7,360,031 B2 | 4/2008 | Lakshmanamurthy et al. | |
| 7,418,555 B2 | 8/2008 | Chung | |
| 7,421,544 B1 | 9/2008 | Wright et al. | |
| 7,644,248 B2 | 1/2010 | Subashchandrabose et al. | |
| 2006/0031641 A1 | 2/2006 | Hataida et al. | |
| 2007/0005868 A1 | 1/2007 | Osborne | |
| 2007/0156994 A1 | 7/2007 | Akkary et al. | |
| 2007/0239942 A1* | 10/2007 | Rajwar et al. | 711/147 |
| 2008/0005504 A1 | 1/2008 | Barnes et al. | |
| 2009/0172295 A1 | 7/2009 | Steiner et al. | |
| 2009/0182956 A1 | 7/2009 | Caprioli et al. | |
| 2010/0257181 A1* | 10/2010 | Zhou et al. | 707/747 |
| 2010/0284405 A1* | 11/2010 | Lim | 370/392 |

FOREIGN PATENT DOCUMENTS

| | | |
|---|---|---|
| JP | 2000-67009 | 3/2000 |
| KR | 10-2005-0011152 | 1/2005 |
| KR | 10-2006-0013330 | 2/2006 |
| KR | 10-2006-0037174 | 5/2006 |
| KR | 10-2008-0016681 | 2/2008 |
| KR | 10-2008-0028826 | 4/2008 |
| KR | 10-2008-0076981 | 8/2008 |
| KR | 10-2009-0025295 | 3/2009 |
| KR | 10-2009-0073983 | 7/2009 |

OTHER PUBLICATIONS

Herlihy et al., "Transaction Memory: Architectural Support for Lock-Free Data Structures," *In Proceedings of the 20Annual International Symposium on Computer Architecture (ISCA'93)*, May 1993, pp. 289-300.

Ananian et al., "Unbounded Transactional Memory," *In Proceedings of the 11International Symposium on High-Performance Computer Architecture (HPCA'05)*, Feb. 2005, pp. 316-327.

Moore et al., "LogTM: Log-based Transactional Memory," *In Proceedings of the 11International Symposium on High-Performance Computer Architecture (HPCA'06)*, Feb. 2005, pp. 254-265.

* cited by examiner

*Primary Examiner* — Brian Peugh
(74) *Attorney, Agent, or Firm* — NSIP Law

(57) ABSTRACT

An unbounded transactional memory system which can process overflow data. The unbounded transactional memory system may include a host processor, a memory, and a memory processor. The host processor may include an execution unit to perform a transaction, and a cache to temporarily store data. The memory processor may store overflow data in overflow storage included in the memory in response to an overflow event in which the overflow data is generated in the cache during the transaction.

18 Claims, 17 Drawing Sheets

CONFLICT DETECTION (OVERFLOW)

INITIAL STATE

TRANSACTION_BEGIN

TRANSACTION_END

OVERFLOW

COMMIT_TRANSACTION

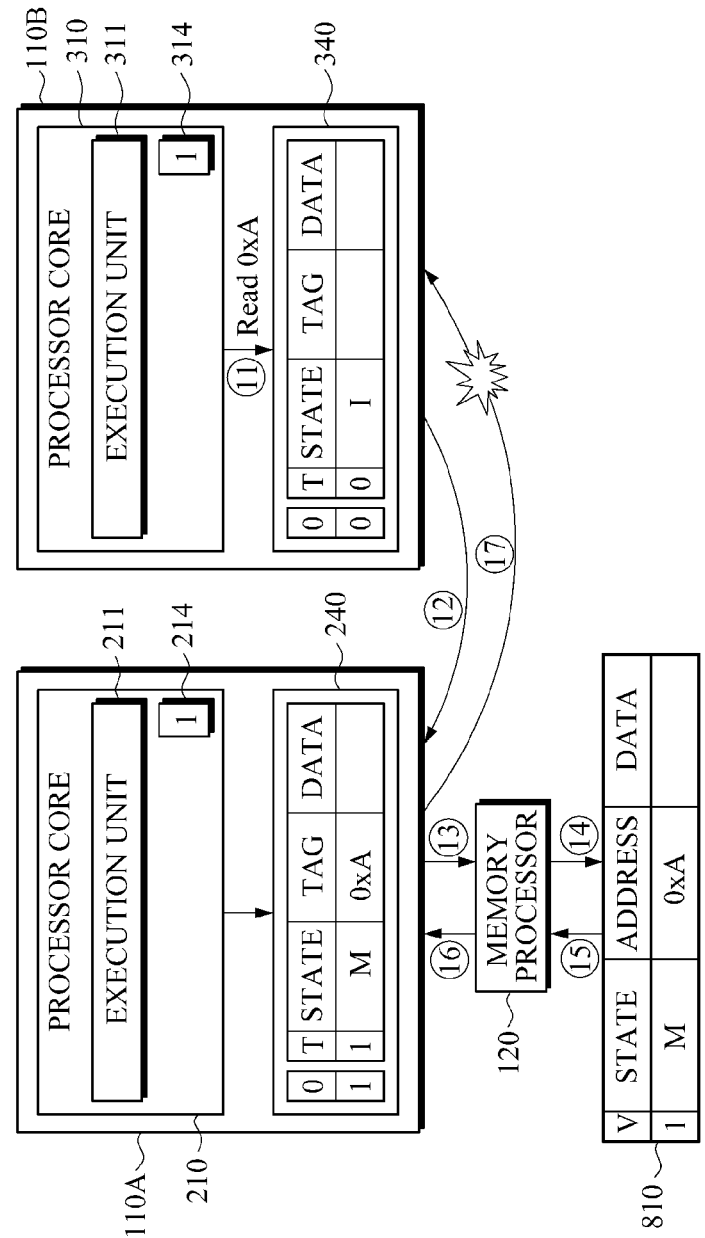

FIG. 10

| 6 | 5 | 4 | 3 | 2 | 1 | 0 |
|---|---|---|---|---|---|---|
| AC | CF | CMNS | CMS | CND | CD | OH |

UNBOUNDED TRANSACTIONAL MEMORY SYSTEM AND METHOD

CROSS-REFERENCE TO RELATED APPLICATION(S)

This application claims the benefit under 35 U.S.C. §119(a) of Korean Patent Application No. 10-2010-0000614, filed on Jan. 5, 2010, the entire disclosure of which is incorporated herein by reference for all purposes.

BACKGROUND

1. Field

The following description relates to a transactional memory, and more particularly, to a hardware based unbounded transactional memory system.

2. Description of the Related Art

A conventional processor generally includes several cores integrated onto a single chip, and it is expected that an ever increasing number of cores will be mounted onto single chips for a processor. Due to such trend, the importance of parallel processing has been increasingly recognized.

In a multi-core environment, locks are used as a solution for synchronization problems. Locks allow access to a shared memory in a mutually exclusive way. However, the use of locks may result in various drawbacks such as deadlock, convoy effect, priority inversion, and the like. Deadlock is a failure or inability to proceed due to two processors both requiring a response from the other before completing an operation. Priority inversion occurs when a high priority task is indirectly preempted by a medium priority task effectively "inverting" the relative priorities of the two tasks. The convoy effect is the slow down of instructions due to queuing caused by slow processing. In addition, it is difficult to implement a fine-grain lock for efficiently utilizing the locks.

A transactional memory has been proposed to facilitate parallel programming. Generally, a "transactional memory" refers to a synchronization model that allows a number of threads to simultaneously access shared resources, such as a data structure stored in a memory, without acquiring locks, as long as access conflict does not occur. For example, the threads may simultaneously access shared resources as long as the threads access different parts of the shared resources. Recently, to make the hardware transactional memory system more useful, an unbounded transactional memory has been introduced, which enables the management of data larger than a cache size.

SUMMARY

In one general aspect, there is provided an unbounded transactional memory system including: a host processor including: an execution unit configured to perform a transaction, and a cache configured to temporarily store data, a memory, and a memory processor configured to store overflow data in overflow storage included in the memory in response to an overflow event in which the overflow data is generated in the cache during the transaction.

The unbounded transactional memory system may further include that the cache includes a plurality of cache sets, each cache set including a plurality of cache lines, each cache line including a T bit configured to indicate whether the cache line is accessed by a transaction, each cache set including an O bit configured to indicate whether the cache set has overflowed.

The unbounded transactional memory system may further include that, in response to data generated by a transaction being greater than a size of a cache set to store the data, the host processor is configured to: generate an overflow event, set an O bit in the cache set, and transmit the overflow event to the memory processor to inform of the occurrence of the overflow event.

The unbounded transactional memory system may further include that the host processor further includes a transaction counter register configured to indicate a number of nested transactions.

The unbounded transactional memory system may further include that the host processor further includes a register check point register configured to store data that has been previously generated during execution of previous instructions before a transaction_begin instruction, in response to the host processor executing the transaction_begin instruction.

The unbounded transactional memory system may further include that: in response to the transaction that causes the overflow event being committed, the host processor is configured to generate a commit_transaction event, and the memory processor is further configured to flush the overflow data to the memory in response to the commit_transaction event.

The unbounded transactional memory system may further include that: in response to the transaction that causes the overflow event being aborted, the host processor is configured to generate an abort_transaction event, and the memory processor is further configured to invalidate the overflow data from the overflow storage in response to the abort_transaction event.

The unbounded transactional memory system may further include that: in response to the host processor including the cache set with an O bit set therein performing the transaction that causes the overflow event and a different host processor requesting data from the memory in its own transaction, the host processor is configured to generate a conflict_detection event, and the memory processor is further configured to determine whether an address of the requested data is stored in the overflow storage, in response to the conflict_detection event.

The unbounded transactional memory system may further include that: in response to a cache miss occurring in the host processor including the cache set with an O bit set therein while the transaction that causes the overflow event is performed, the host processor is configured to generate a cache_miss event, and the memory processor is further configured to determine whether data of an address at which the cache miss occurs is stored in the overflow storage, in response to the cache_miss event.

The unbounded transactional memory system may further include that the memory processor includes: a handler configured to process an event received from the host processor, and a plurality of registers configured to be set for processing the event, the plurality of registers including: a processor identification register, a data register, an address register, a cache state register, and an event notification register.

The unbounded transactional memory system may further include that the overflow storage includes a hash table corresponding to the host processor, the hash table configured to store the overflow data in a storage space indexed by a value hashed from an address of the overflow data.

The unbounded transactional memory system may further include that, in response to a plurality of host processors being present, the overflow storage includes a global hash table configured to store overflow data of the respective host processors using processor IDs of the respective host processors.

In another general aspect, there is provided a method of operating a unbounded transactional memory system including a host processor including an execution unit to perform a transaction and a cache to temporarily store data, a memory, and a memory processor interposed between the host processor and the memory, the method including: generating an overflow event in response to data being overflowed in the cache of the host processor that is performing the transaction, and in response to the overflow event, storing the overflow data in overflow storage included in the memory using the memory processor.

The method may further include that the cache includes a plurality of cache sets, each cache set including a plurality of cache lines, each cache line including a T bit indicating whether the cache line is accessed by a transaction, each cache set including an O bit indicating whether the cache set has been overflowed.

The method may further include that the generating of the overflow event includes: in response to data generated by a transaction being greater than a size of a cache set to store the data: generating the overflow event, and setting an O bit in the cache set, and transmitting the overflow event to the memory processor to inform of the occurrence of the overflow event.

The method may further include: in response to the host processor executing the transaction_begin instruction, storing data that has been previously generated during execution of previous instructions before a transaction_begin instruction in a register check point register included in the host processor.

The method may further include: generating, at the host processor, a commit_transaction event in response to the transaction that causes the overflow event being committed, and flushing, at the memory processor, the overflow data to the memory in response to the commit_transaction event.

The method may further include: generating, at the host processor, an abort_transaction event in response to the transaction that causes the overflow event being aborted, and invalidating, at the memory processor, the overflow data from the overflow storage in response to the abort_transaction event.

The method may further include: in response to the host processor including the cache set with an O bit set therein performing the transaction that causes the overflow event and a different host processor requesting data from the memory in its own transaction, generating a conflict_detection event at the host processor, determining, at the memory processor, whether an address of the requested data is stored in the overflow storage, in response to the conflict_detection event, and transmitting the determination result from the memory processor to the host processor.

The method may further include: in response to a cache miss occurring in the host processor including the cache set with an O bit set therein while the transaction that causes the overflow event is performed, generating a cache_miss event at the host processor, determining, at the memory processor, whether data of an address at which the cache miss occurs is stored in the overflow storage, in response to the cache_miss event, and transmitting the determination result from the memory processor to the host processor.

Other features and aspects may be apparent from the following detailed description, the drawings, and the claims.

BRIEF DESCRIPTION OF THE DRAWINGS

FIG. 8D is a diagram illustrating an example of a transactional memory system in which a conflict is detected between host processors after overflow occurs in one of the host processors.

FIG. 10 is a diagram illustrating an example of a structure of an event notification register.

Figure 1:
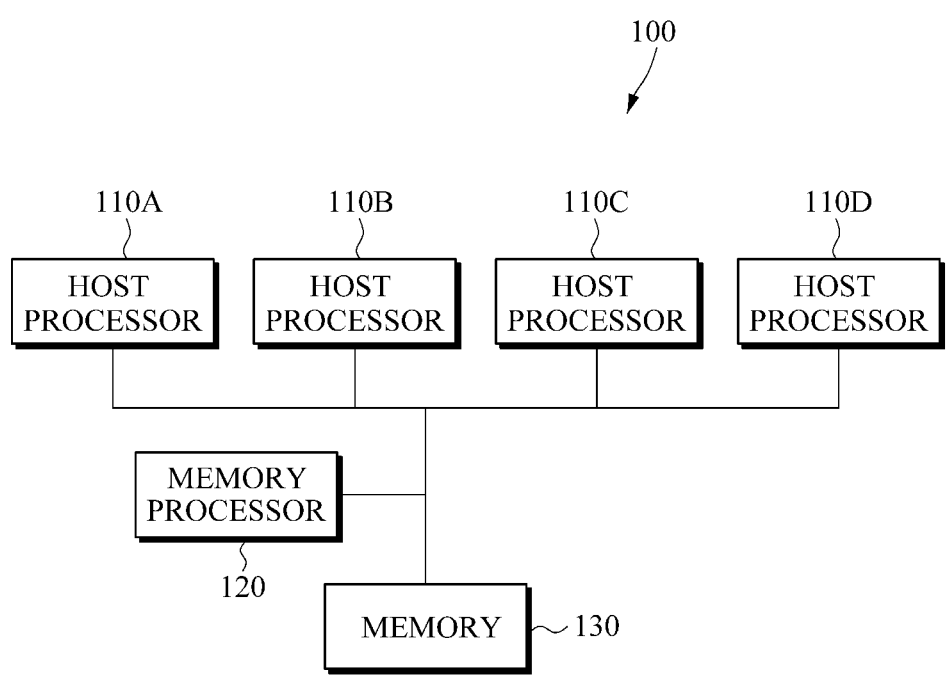
FIG. 1 is a diagram illustrating an example of an unbounded transactional memory system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 illustrates an example of an unbounded transactional memory system.

The unbounded transactional memory system 100 may be referred to as a processing-in-memory transactional memory (PIMTM). Hereinafter, for convenience of explanation, the unbounded transactional memory system 100 will be referred to simply as a "memory system 100." The memory system 100 may include one or more host processors 110A, 110B, 110C, and 110D, a memory processor 120, and a memory 130. The memory system 100 may be used in various integrated circuit devices or systems such as a mobile phone, a personal digital assistant (PDA), a built-in controller, a mobile platform, a desktop platform, a server platform, and the like.

As a non-exhaustive illustration only, the system described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like consistent with that disclosed herein.

Each host processor 110A, 110B, 110C, 110D may perform a transaction. The process of executing the transaction may include grouping a plurality of instructions or actions into transactions, atomic sections of code, or critical sections of code. In the example illustrated in FIG. 1, four host processors are provided, but the number of host processors that the memory system 100 may include is not limited thereto.

Each of the host processors 110A, 110B, 110C, 110D may include a cache (e.g., caches 220, 230, 240 in FIG. 2 described below) to support fast data input/output. The host processors may include a hierarchical cache structure. The cache may be a set associative cache as shown in an example illustrated in FIG. 3. The cache may include a plurality of cache sets, and each cache set may include a plurality of cache lines.

The cache included in each of the host processors 110A, 110B, 110C, 110D may include two additional bits added to a general cache structure. The two additional bits may be a transaction bit (hereinafter, referred to as a "T bit") and an overflow bit (hereinafter, referred to as a "O bit"). The T bit is a bit set for cache lines, and the O bit is a bit set for cache sets. The cache lines may include cached data and a tag indicating an index and status of the cached data, and may indicate locations of individual data.

The T bit may be set in response to a load instruction for loading data from the memory 130 to each cache line on the cache or a store instruction for storing the data in each cache line on the cache being executed during transaction processing. The O bit may be set in response to the T bit being set in every cache line of a cache set and a new cache line being stored in the cache set in which every cache line has a T bit set therein. That is, the O bit may be set in an overflow state in which the cache set cannot accommodate a new cache line without replacing an existing cache line with the new cache line. Thus, the O bit may indicate whether memory accesses occur more than the number of cache lines belonging to the cache set. The T bit and the O bit may be set, e.g., as either "1" or "0" to be enabled or disabled.

The memory system 100 may perform eager conflict detection and lazy version management.

Eager conflict detection may solve a conflict of data which is requested to be written in a first transaction and is requested to be written or read in a second transaction concurrent with the first transaction while transactions are performed.

In lazy version management, which is performed in the course of data processing, data may be read from a memory, and, in response to data change occurring, the changed data may be temporarily stored in a speculative buffer instead of the memory while the original data is retained in the memory. Thereafter, the changed data may be finally stored in the memory in response to completing data processing. Since the data is not stored in the memory before a transaction is completed, even when the transaction is aborted, only the data stored in the speculative buffer may need to be disabled without accessing the memory, enabling fast transaction abort processing.

The memory system 100 may use the caches of the respective host processors 110A, 110B, 110C, 110D instead of the memory 130 as speculative buffers and may temporarily store data in each cache. The data temporarily stored in each speculative buffer is referred to as "speculative data."

Where the speculative data is larger than a cache size, data overflow may occur. In most conventional general hardware transactional memories, if a working set of a current transaction is larger than a cache size, data is stored in a predetermined storage space, and if a working set is larger than a memory area currently allocated, the transaction is aborted. Once the transaction is aborted due to the occurrence of overflow, time and resources spent from the beginning of the transaction until the occurrence of the overflow are wasted. In addition, since hardware logic is used to solve the overflow problem, the overflow processing method is limited and difficult to be modified.

However, unlike the conventional systems, the memory system shown in the example illustrated in FIG. 1 may maintain overflowed cache lines in a software fashion using the memory processor 120 connected to a memory bus. For example, in response to data overflow occurring during the processing of a transaction by the host processor 110A, the host processor 110A may transfer the data that has overflowed (hereinafter referred to as "overflow data") to the memory processor 120. Then, the memory processor 120 may maintain the data in overflow storage included in the memory 130.

Thus, the memory processor 120 may function as a handler that processes overflow data. The memory processor 120 may use a software handler operating on a hardware processor to function as the handler required for processing the overflow data. By using the software handler, a newly improved algorithm can be provided faster, and flexibility can increased, compared with the conventional system in which a handler is implemented using hardware logic. Moreover, the software handler may process the overflow data in association with an operating system, and a memory area of the memory 130 to store the overflow data can be dynamically allocated.

The memory processor 120 may not need to be involved with cache coherency protocol performed by the host processors 110A, 110B, 110C, and 110D, enabling faster access to the memory 130. The memory processor 120 may maintain only the overflow data. Since the memory processor 120 may be located closer to the memory 130 than the host processor 110A, the memory processor 120 may have shorter memory access delay time than the host processor 110A.

The memory 130 may store data, and may include overflow storage (see FIG. 4) to store data overflowed from each host processor 110A, 110B, 110C, 110D. However, the overflow storage may be disposed in a different location.

The memory 130 may include a memory controller (not shown) for data input/output in response to a request from a space of the memory itself and from an external element. The memory 130 may store information of the original state of data, which is to be transformed due to the transaction, until the transaction is committed. The memory processor 120 may store overflow data (or cache lines) to be accessed internally by the transaction in the overflow storage of the memory 130. The overflow storage may include a hash table. The structure of the hash table will be described in detail with reference to FIGS. 4 and 5.

Transaction related operations of the host processors 110A, 110B, 110C, 110D will be described, focusing on the operations of the host processor 110A.

The host processor 110A may generate five events according to situations and may transfer a message informing of the occurrence of the event to the memory processor 120 in response to data overflow occurring. The five events may include an overflow event, an abort_transaction event, a commit_transaction event, a conflict_detection event, and a cache_miss event. The host processor 110A may generate an event message corresponding to each of the events and may transmit the event message to the memory processor 120. The memory processor 120 may perform an operation according to the event generated by the host processor 110A.

The host processor 110A may generate an overflow event in response to the host processor 110A being unable to store data in a cache while processing a transaction. Then, the host processor 110A may transmit the overflow event to the memory processor 120. The overflow event may occur in response to the host processor 110A having a victim cache line in which a T bit set is set. A "victim" or a "victim cache line" refers to a cache line that is to be evicted from a cache set for replacement.

The host processor 110A may generate an abort_transaction event and may transmit the event to the memory processor 120 in response to the host processor 110A receiving an abort message from another host processor 110B, 110C, 110D to abort the transaction, or in response to the host processor 110A itself deciding to abort the transaction. If there is no overflowed cache line, an event message informing of the abort_transaction event may not need to be transmitted. In response to the occurrence of the abort_transaction event, speculative data that has been stored in a cache during the transaction and data that has been stored in the overflow storage due to the occurrence of the overflow may be removed.

In response to the host processor 110A completing transaction processing normally and requirements of the transaction commit being satisfied, the host processor 110A may generate a commit_transaction event and transmit the event to the memory processor 120. If no overflow data exists, there may be no need to transmit a message informing of the commit_transaction event to the memory processor 120. Once a commit is performed, the speculative data stored in the cache and the overflow storage may be permanently written and may be visible to the other host processors 110B, 110C, 110D.

In response to a cache miss occurring, the host processor 110A may generate a cache_miss event and may transmit the event to the memory processor 120. The cache_miss event may be transmitted in response to the host processor 110A acquiring the cache miss and an O bit of a corresponding cache set being enabled. In response to a cache line being detected in the overflow storage, the cache line may be serviced by the memory processor 120 instead of another processor 110B, 110C, 110D or the memory 130.

The host processor 110A may generate a conflict_detection event and may transmit the event to the memory processor 120 in response to the host processor 110A being unable to resolve the conflict. In response to an address of data to be read and/or written in another transaction, for example, a transaction performed by the host processor 110B, being mapped to a cache set of the host processor 110A which has an O bit set, the host processor 110A may generate the conflict_detection event.

The host processor 110A may check the conflict detection, like the other hardware transactional memories. The host processor 110A may confirm whether system conflict occurs each time a memory access takes place. Generally, hardware transactional memories utilize a cache coherency protocol to detect the conflict. The host processor 110A may be implemented on a common bus structure and may use a snoop-based Modified, Exclusive, Shared, Invalid (MESI) protocol for cache coherency and memory coherency.

The memory processor 120 may detect conflicts in various stages.

One of the host processors 110A, 110B, 110C, 110D may transmit a request for data having a predetermined address to the memory 130 through a common bus. For example, in response to the host processor 110B transmitting a request for data having a predetermined address to the memory 130, the other host processors 110A, 110C, 110D may snoop the request.

Each of the other host processors 110A, 110C, 110D may check their cache line to determine whether the requested data is stored. The respective snooping host processors 110A, 110C, 110D may detect a conflict by transmitting the address of the requested data to the memory processor 120 in response to an O bit being set in each cache set of the snooping host processors 110A, 110C, 110D to which the address of the requested data is mapped.

Operations of the snooping host processors 110A, 110C, 110D are described below, focusing on the snooping host processor 110A as an example. The host processor 110A may check its cache set to determine whether the data requested by the host processor 110B is stored. In response to the host processor 110A learning that its cache set has overflowed, the host processor 110A may request the memory processor 120 to detect the presence of overflow data to determine whether the data requested by the host processor 110B is stored in the overflow storage. The memory processor 120 may examine the overflow storage in response to the request from the host processor 110A and may check whether the relevant address is present in the overflow storage. The memory processor 120 may notify the host processor 110A of the occurrence of a conflict.

In response to the notification from the memory processor 120, the host processor 110A may perform an operation for solving the conflict. For example, the host processor 110A may request the host processor 110B to abort a transaction and roll back. Alternatively, the memory processor 120 may issue a transaction aborting message that requests transaction abort to the host processor 110B.

A conflict between two transactions may occur in response to the same cache line being accessed by the two transactions and at least one of the transactions being a write access. That is, when one transaction's read set or write set overlaps with the other transaction's write set, the transactions may conflict. In the memory system 100, a T bit may be set and cache lines may include modified cache lines (for example, in a modified state according to MESI) in a write set. In addition, a T bit may be set and cache lines may include non-modified cache lines (for example, in a shared or exclusive state according to MESI) in a read set.

Figure 2:
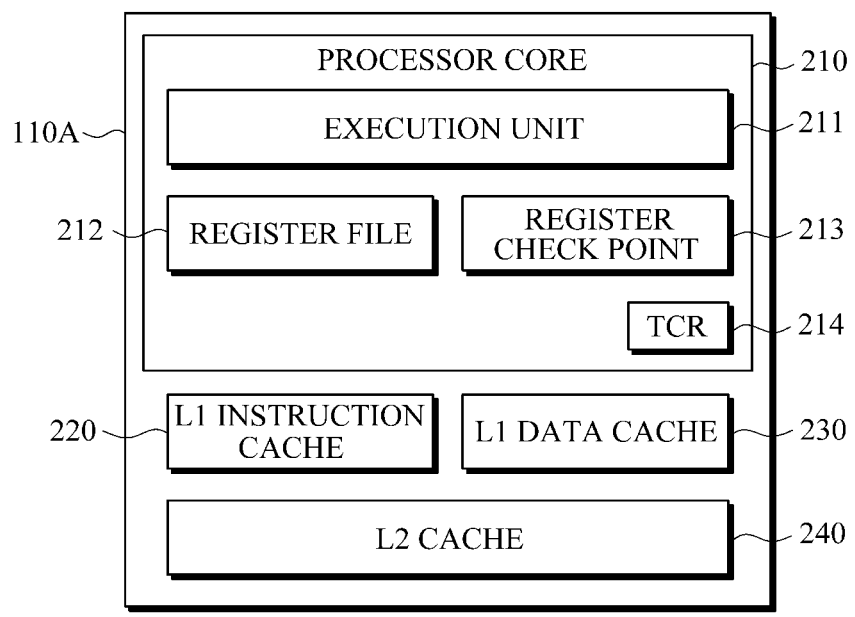
FIG. 2 is a diagram illustrating an example of a structure of a host processor.

FIG. 2 illustrates an example of a structure of a host processor shown in FIG. 1. Referring to FIG. 2, the host processor 110A may include a processor core 210 and caches 220, 230, 240.

The processor core 210 may include an execution unit 211, a register file 212, a register checkpoint 213, and a transaction counter register 214.

The execution unit 211 may perform a transaction_begin instruction and a transaction_end instruction, which may be defined in addition to a general instruction set for a transaction operation. In one example, where a memory system is a PIMTM system, a transaction_begin instruction may be referred to as PIMTM_BEGIN and a transaction_end instruction may be referred to as PIMTM_END. The transaction_begin instruction may be used to notify of the beginning of a transaction, and the transaction_end instruction may be used to notify of the end of the transaction.

The register file 212 is a register that may be included in a general processor. The register checkpoint 213 may be used to store data that has been performed before a transaction. Data stored in the register checkpoint 213 may be used for rollback to restore an operational state of the execution unit 211 to its state prior to the transaction in response to the transaction being aborted while the execution unit 211 is executing the transaction. The transaction counter register (TCR) 214 may indicate the depth of nested transactions.

The TCR 214 may store a transaction count value which may be configured to increase by one each time the execution unit 211 encounters a transaction_begin instruction. In response to the transaction_begin instruction being called in the transaction, that is, in response to the execution unit 211 performing nested transactions in which one transaction is to be performed inside another transaction, a value of the TCR 214 may be greater than "1". The processor core 210 may induce a rollback by starting the outermost transaction of the nested transactions in response to the transaction having to be aborted due to conflict detection from the nested transactions.

In response to the host processor 110A encountering the transaction_end instruction, the TCR 214 may decrease by 1. In response the TCR 214 becoming "0", it may indicate that the transaction is ended, and the host processor 110A may commit all speculative states, and the other threads may become visible.

A level-1 (L1) instruction cache 230 may be a first level cache and may store an instruction. A L1 data cache 240 may be a first layer cache, and may store data. A level-2 (L2) cache 250 may be a second level cache and may store an instruction and/or data.

Figure 3:
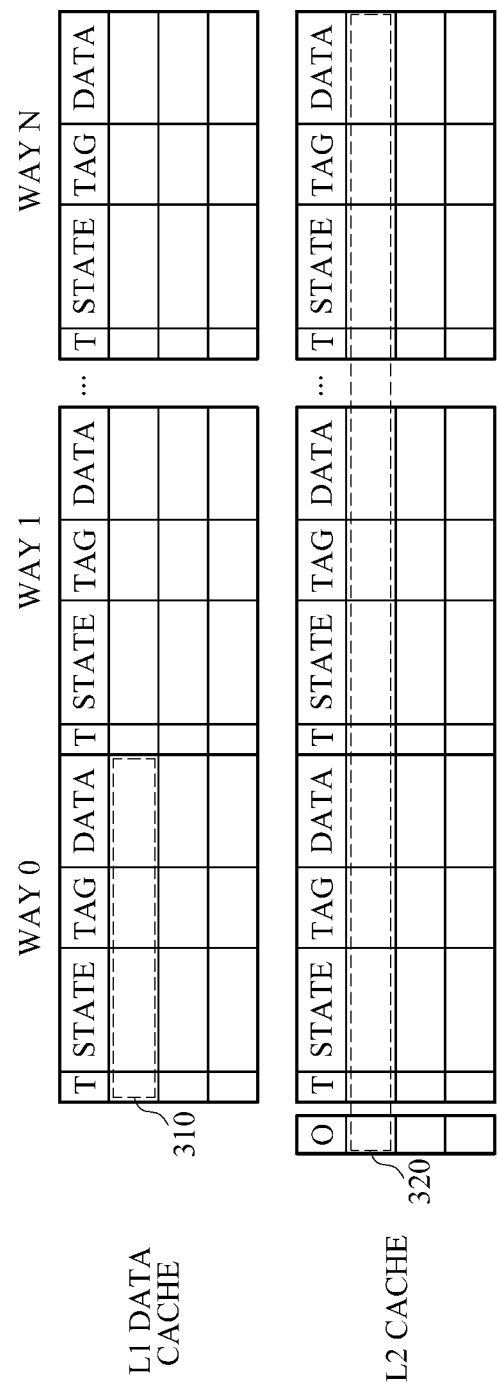
FIG. 3 is a diagram illustrating an example of structures of an L1 data cache and an L2 cache of a host processor illustrated in FIG. 2.

FIG. 3 illustrates an example of structures of an L1 data cache and an L2 cache of a host processor illustrated in FIG. 2. Referring to FIG. 3, the structure of each of the L1 data cache 230 and the L2 cache 240 may be similar to a structure of the general cache in that the structure may include states, tags, and data. However, the L1 data cache 230 has T bits added thereon, and the L2 cache has T bits and O bits added thereon. Reference numeral 310 denotes an example cache line and reference numeral 320 denotes an example cache set.

The T bit may be associated with a cache line, and the O bit may be associated with a cache set. The T bit may indicate that the cache line is accessed in the transaction. As described above, the T bit may be set in response to a load or store instruction accessing the cache line in the transaction. The O bit may be set in response to the T bit having been set in each cache line in the corresponding cache set and a new cache line having to be replaced with one of the cache lines of the cache set. The T bit may be set in each cache line of the L1 data cache 230 and the L2 cache 240, and the O bit may be set for each cache set of the L2 cache 240. Setting the O bit may indicate a working set of a current transaction being greater than a cache size.

In response to a predetermined cache line being accessed according to a write instruction, speculative data may be stored in the cache line. In response to aborting a transaction, the data stored in the cache line may be invalidated. Where a T bit is set in response to a cache line of the L1 data cache 230 being accessed in a transaction, if the transaction is committed, the T bit in the corresponding cache line may be cleared. The clearance of the T bit may indicate that the cache line is not speculative any longer, and data of the cache line may not need to be copied to the memory.

Since the L2 cache 240 may include all data stored in the L1 data cache 230, the same data stored in the L1 data cache 230 and the L2 cache 240 may need to be coherently managed. In response to the processor core 210 setting a T bit in a cache line of the L1 data cache 230 in which predetermined data is stored or clearing the set T bit from the cache line, the processor core 210 may set a T bit in a cache line of the L2 cache in which the same data is stored as the data stored in the L1 data cache 230 or may clear the set T bit from the cache line of the L2 cache.

In response to a cache miss occurring in a transaction for the L2 cache 240, the memory 130 (see FIG. 1) may load data corresponding to the cache miss to a cache set of the L2 cache associated with the cache miss. If the cache set of the L2 cache includes an empty cache line in which a T bit has not been set, the data corresponding to the cache miss may be loaded to the empty cache line.

However, if the T bit is set in every cache line of the cache set, it may be impossible for a new cache line to be stored in the cache set, and one of cache lines of the cache set may be selected as a victim cache line. Where the memory system 100 performs lazy version management, data stored in the victim cache line in which the T bit has been set may be speculative data that may be used in transaction processing until the transaction ends, and may not be invalidated. Therefore, the data stored in the victim cache line in which the T bit has been set may not be stored in the memory 130, but may need to be stored in a separate storing space.

As such, in response to each cache line of a cache set in which a new cache line is to be stored having a T bit set therein, the host processor 110A may generate an overflow event, may set an O bit in the cache set, and may transfer the victim cache line to the memory processor 120. The memory processor 120 may receive the overflow event and cache data of the victim cache line. The memory processor 120 may safely store the cache data of the victim cache line in the overflow storage.

Figure 4:
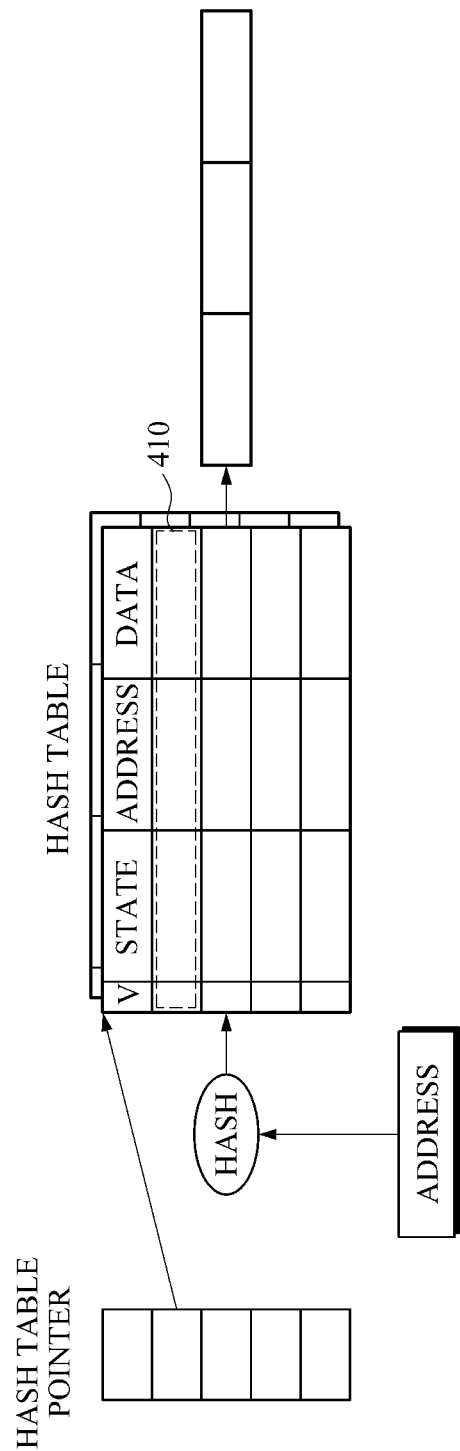
FIG. 4 is a diagram illustrating an example of a structure of overflow storage.

FIG. 4 illustrates an example of a structure of overflow storage. The overflow storage may include hash tables corresponding to the respective host processors 110A, 110B, 110C, 110D. The overflow storage may be managed by the memory processor 120, and may have a predetermined size within a range supported by the memory 130.

In response to overflow occurring in the host processor 110A, an address of a victim cache line may be hashed and mapped to a bucket. Reference numeral 410 denotes an example of a bucket. Individual entries of the bucket may include all data of the cache line. That is, a state, a tag, and data of the cache line may be respectively mapped to a state, an address, and data of the bucket. A valid (V) bit in each entry of the bucket may indicate whether the state, the address, and the data of the bucket are valid or not. Individual entries included in a hash table pointer may be configured to include point information indicating hash tables corresponding to the respective host processors.

In response to the host processor 110A requesting the memory processor 120 to perform cache miss processing or conflict detection processing on a cache line, the memory processor 120 may search to find a hash table corresponding to the host processor 110A and may identify whether the found hash table includes the cache line.

Figure 5:
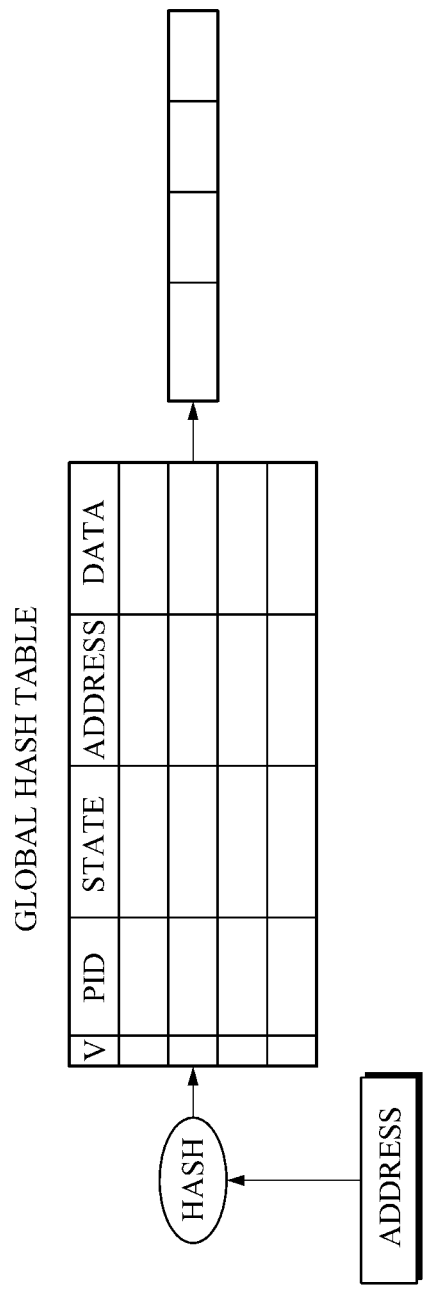
FIG. 5 shows an example of a global hash table.

FIG. 5 illustrates an example of a global hash table. The global hash table illustrated in FIG. 5 may be further used for fast conflict detection, in addition to the overflow storage illustrated in FIG. 4.

For the conflict detection, all snooping host processors, e.g., the host processors 110A, 110C, 110D illustrated in FIG. 1, may provide addresses to request the memory processor 120 to check whether cache lines corresponding to the addresses are present in the corresponding hash tables. The memory processor 120 may detect a conflict faster using the global hash table shown in the example illustrated in FIG. 5.

The global hash table may be a hash table generated by integrating hash tables corresponding to individual processors. The global hash table may further include a processor identification (ID) field in addition to the hash table illustrated in FIG. 4. The processor ID field may be for identifying an overflowed cache line of a processor which sent an event message.

Although the memory processor 120 may not be generally involved with cache coherency protocol of the host processors 110A, 110C, 110D, the memory processor 120 may support snooping for fast conflict detection. In one example, the memory processor 120 may use the global hash table to detect the occurrence of conflict in advance, and then notify the host processors 110A, 110C, 110D of the conflict event more quickly than when using the hash tables illustrated in FIG. 4. Most data stored in the global hash table and the entries of the hash tables corresponding to the respective processors may be identical with each other. Thus, actual data may be stored in each hash table corresponding to the individual processor, and the global hash table may be configured to include entry pointer information that indicates an entry of each hash table corresponding to the individual processor.

FIGS. 6A to 6D illustrate examples of operations of a host processor according to transaction processing. Although the host processor may originally have a structure including two-level caches, each example illustrated in FIGS. 6A to 6D shows a structure including only an L2 cache 240 for convenience of explanation.

Figure 6A:
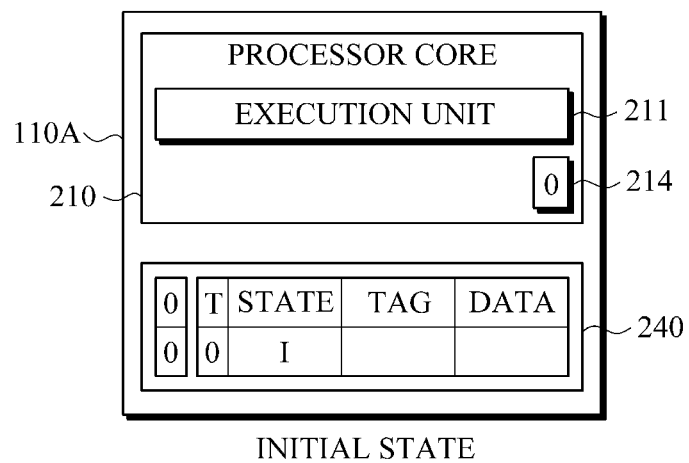
FIGS. 6A to 6D are diagrams illustrating examples of operations of a host processor according to transaction processing.

FIG. 6A illustrates an example of the host processor in an initial state. In the initial state, a TCR 214 of the host processor 110A may be set to "0". A T bit and an O bit of the L2 cache are set to "0".

Figure 6B:
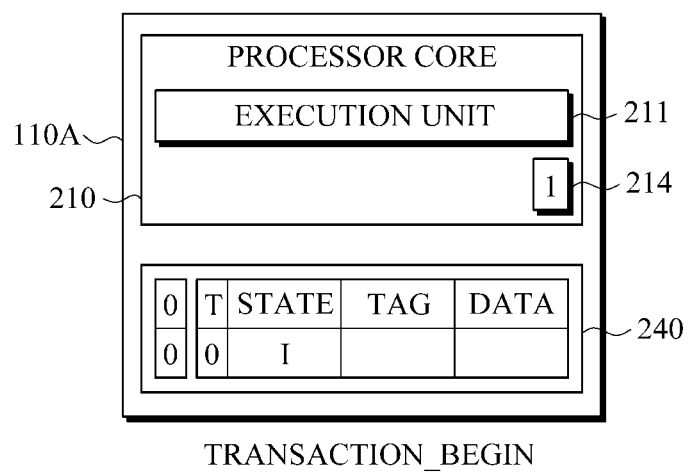

FIG. 6B illustrates an example of the host processor which may perform a transaction_begin instruction after fetching the transaction_begin instruction. In response to the host processor 110A encountering the transaction_begin instruction, a value of the TCR 214 may increase by 1, as shown in the example illustrated in FIG. 6B. In response to a value of the TCR 214 becoming 1, the host processor 110A may copy data of a register file 212 to a register check point 213 for rollback that may be performed later.

Figure 6C:
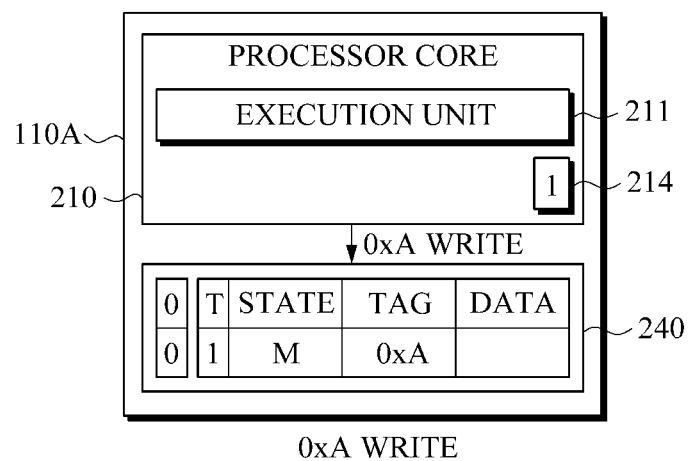

FIG. 6C illustrates an example of the host processor when the host processor executes a write instruction. In response to the host processor 110A performing a data write operation on a 0xA address, the host processor 110A may load data of the 0xA address from the memory 130 to the L2 cache 240, and may set the T bit of a cache line in which the loaded data is stored is set to "1". The cache line may enter a modified state.

Figure 6D:
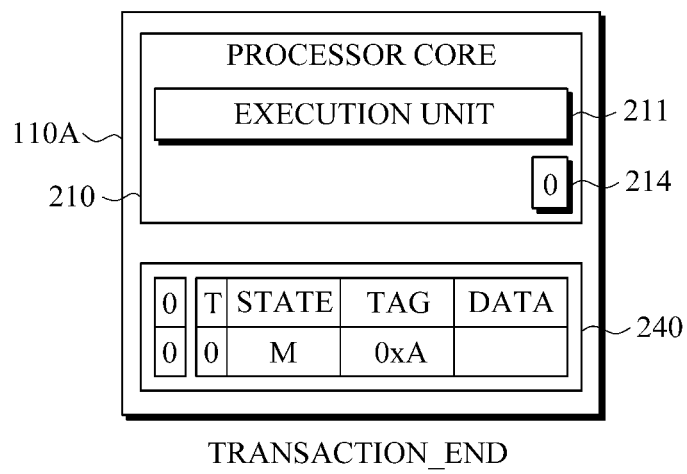

FIG. 6D illustrates an example of the host processor which may perform a transaction_end instruction. As shown in the example illustrated in FIG. 6D, the host processor 110A may decrease a value of the TCR 214 by 1 in response to the execution of the transaction_end instruction. In response to the value of the TCR 214 being changed from "1" to "0", a transaction may be committed and data that has been stored in the L2 cache 240 during the transaction may become non-speculative. In the examples illustrated in FIGS. 6A to 6D, overflow may not occur in the host processor 110A.

Figure 7:
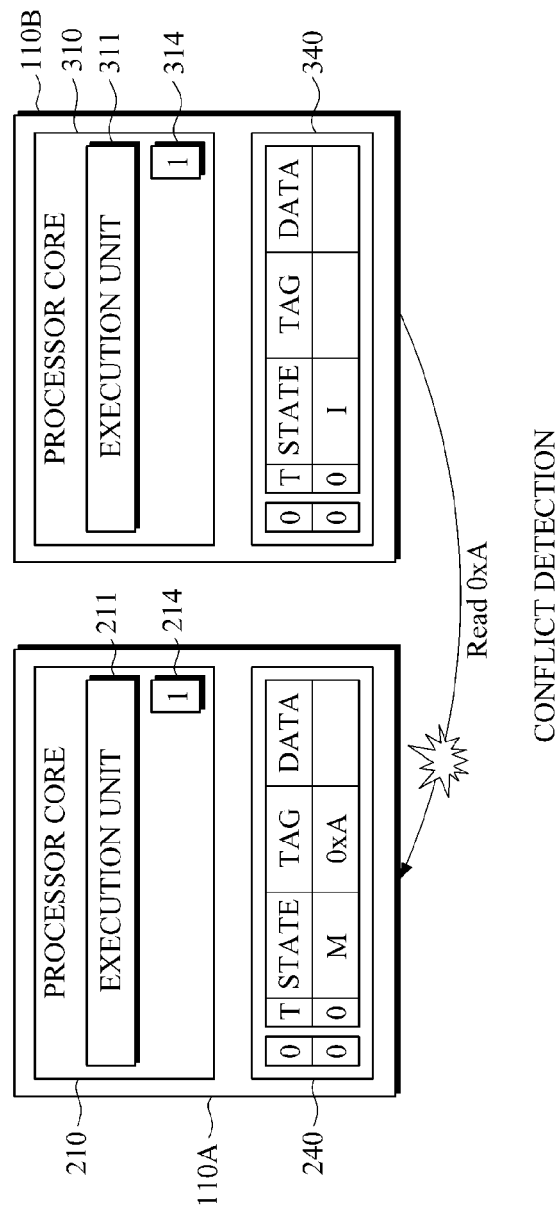
FIG. 7 is a diagram illustrating an example of host processors when a conflict between host processors is detected before the occurrence of overflow.

FIG. 7 illustrates an example of host processors when a conflict between host processors is detected before the occurrence of overflow.

For example, it may be presumed that while a host processor 110A is performing a data write operation on an address of 0xA by loading data of the address of 0xA to an L2 cache 240 during performing a transaction, another host processor, for example, 110B may request to read the data (or a cache line) at the address which has been already loaded in the host processor 110A. Then, the host processor 110A may be able to know that another host processor 110B requests the data (or a cache line) which has been already loaded at the address of the L2 cache 240 because the host processor 110A may be snooping the host processor 110B.

The O bit of the L2 cache 240 of the host processor 110A may be set to "0", which may indicate that no overflow occurs. Thus, the host processor 110A may not need to generate an overflow event and notify the memory processor 120, but may only need to transmit a transaction_abort message to the host processor 110B to resolve the conflict.

Figure 8A:
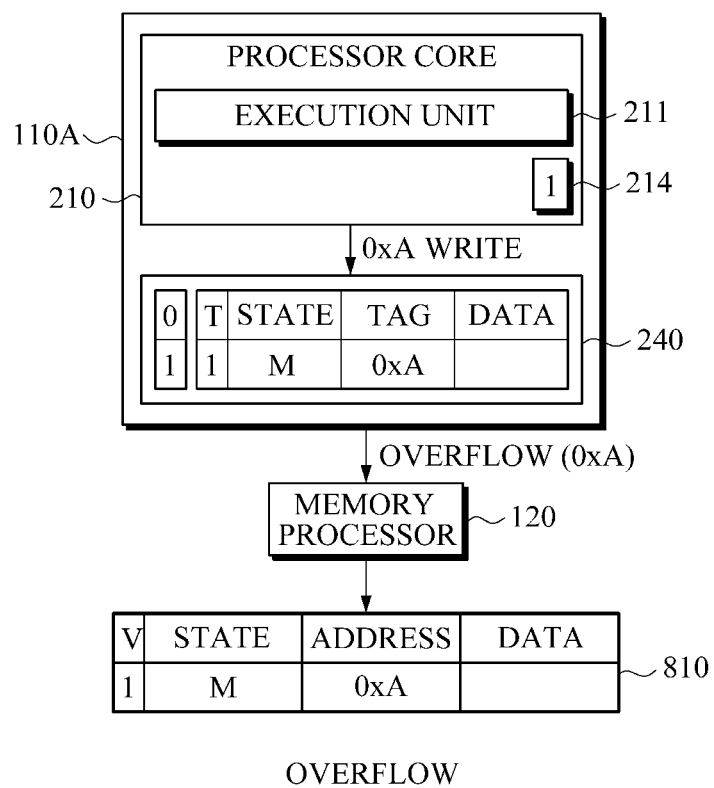
FIG. 8A is a diagram illustrating an example of a transactional memory system in which overflow occurs in a host processor.

FIG. 8A illustrates an example of a transactional memory system in which overflow occurs in a host processor.

Referring to FIG. 8A, an O bit and a T bit of an L2 cache 240 of a host processor 110A may be enabled. In one example, in response to new data existing that is to be loaded or stored in a cache set in which the O bit has been already set, the host processor 110A may generate an overflow event.

In response to overflow occurring in a transaction, the host processor 110A may transmit data of a cache line (victim cache line) corresponding to a 0xA address to a memory processor 120, as shown in the example illustrated in FIG. 8A. The memory processor 120 may store the victim cache line in a hash table 810.

Figure 8B:
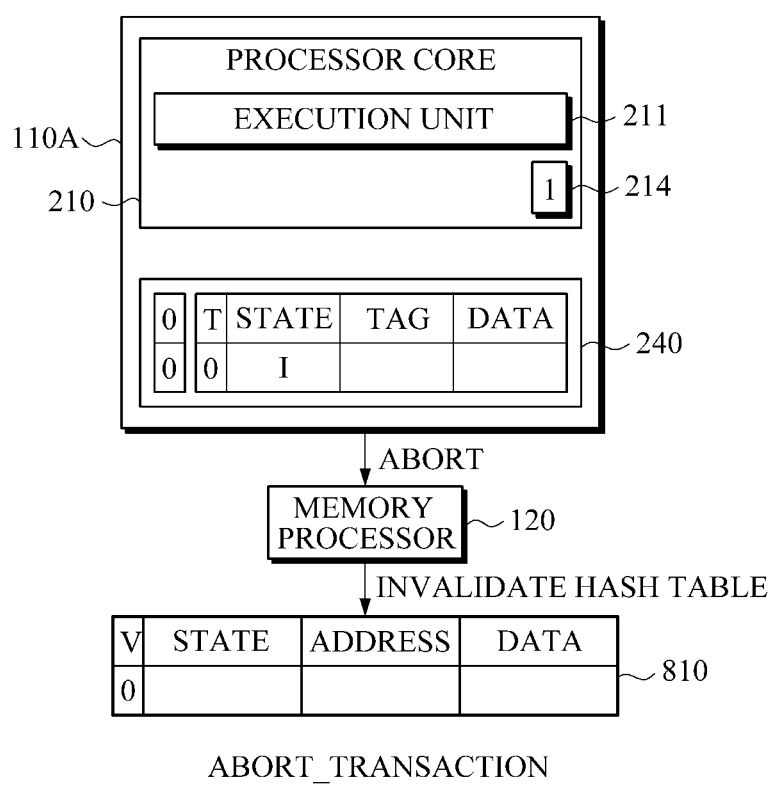
FIG. 8B is a diagram illustrating an example of a transactional memory system in which an abort_transaction event occurs after overflow occurs in a host processor.

FIG. 8B illustrates an example of a transactional memory system in which an abort_transaction event occurs after overflow occurs in a host processor.

A host processor 110A may abort a transaction, and may transmit an abort_transaction event to a memory processor 120. The memory processor 120 may invalidate overflow data that has been generated during the transaction in a hash table 810 corresponding to the host processor 110A which has generated the abort_transaction event.

Figure 8C:
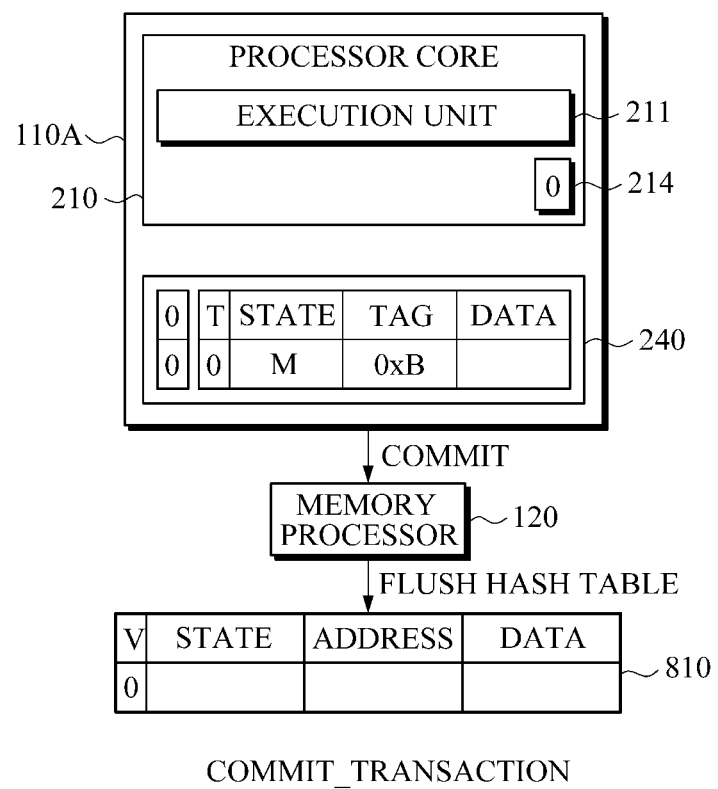
FIG. 8C is a diagram illustrating an example of a transactional memory system in which a commit_transaction event occurs after overflow occurs in a host processor.

FIG. 8C illustrates an example of a transactional memory system in which a commit_transaction event occurs after overflow occurs in a host processor.

In response to encountering a PIMTM_END instruction, the host processor 110A may transmit a commit_transaction event to a memory processor 120. Accordingly, the memory processor 120 may flush overflow data present in a hash table 810 corresponding to the host processor 110A to a memory 130 to store the data definitely in the memory 130, and the data may be visible to the other processors.

FIG. 8D illustrates an example of a transactional memory system in which a conflict is detected between host processors after overflow occurs in one of the host processors.

A host processor 110B may desire to access to read data on an address of 0xA that is a write set of a host processor 110A (11). The host processor 110A may snoop an operation of the host processor 110B (12), and may identify that there is overflow data based on an O bit set in an L2 cache 240.

To check whether the data of the address of 0xA that is desired by the host processor 110B has been used by the host processor 110A, the host processor 110A may generatr a conflict_detection event that inquires of the memory processor 120 whether the data at the address of 0xA is stored in a hash table 810 corresponding to the host processor 110A, as the data may be overflow data generated during a transaction of the host processor 110A, and whether a conflict occurs. Then, the host processor 110A may transmit the conflict_detection event to the memory processor 120 (13).

The memory processor 120 may receive the conflict_detection event from the host processor 110A, and may search the hash table 810 (14) to check whether a conflict occurs with respect to the data at the address of 0xA (15). Then, the memory processor 120 may notify the host processor 110A of the check result (16).

In response to receiving notification of the occurrence of conflict from the memory processor 120 (16), the host processor 110A may resolve the conflict. For example, the host processor 110A may inform of the occurrence of conflict to the host processor 110B such that the host processor 110B may abort an ongoing transaction.

Figure 8E:
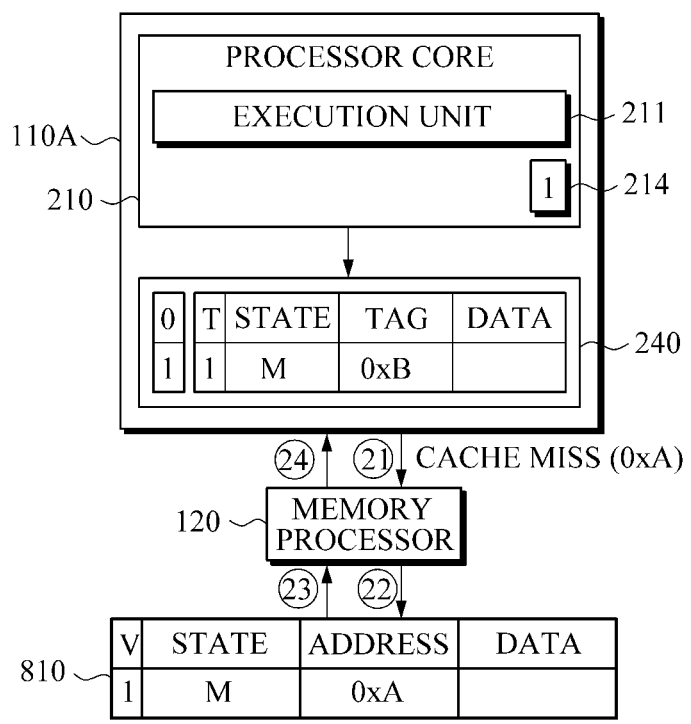
FIG. 8E is a diagram illustrating an example of a transactional memory system in which a cash miss occurs after overflow occurs in a host processor.

FIG. 8E illustrates an example of a transactional memory system in which a cache miss occurs after overflow occurs in a host processor.

In response to a cache miss occurring in a host processor 110A while an O bit is set in an L2 cache 240 of the host processor 110A, the host processor 110A may transmit a cache_miss event to a memory processor 120 to check whether cache-missed data (data on an address of 0xA in FIG. 8E) is present in overflow data in a hash table 810 (21).

The memory processor 120 may determine whether the relevant data is present in the hash table 810 corresponding to the host processor 110A (22) (23), and then may transmit the determination result to the host processor 110A (24). In response to the data being stored, the memory processor 120 may provide the data to the host processor 110A (24).

Figure 9:
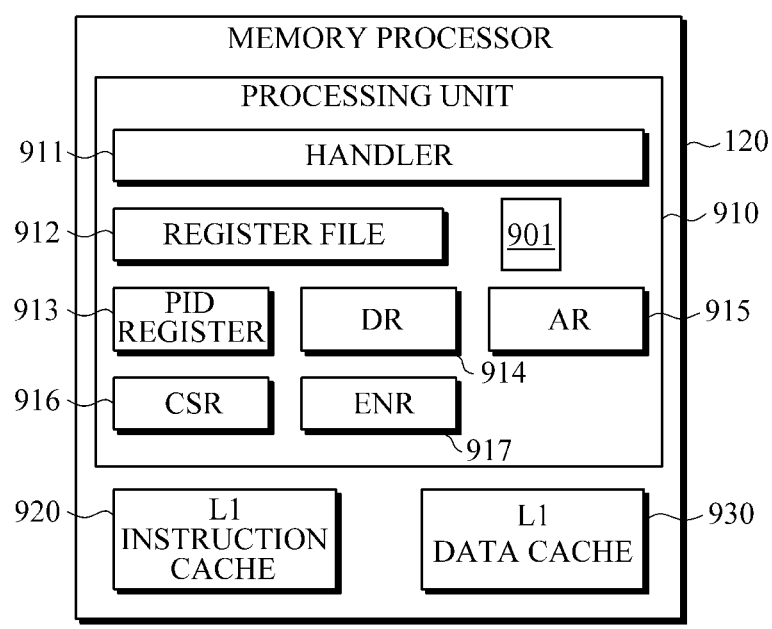
FIG. 9 is a diagram illustrating an example of a structure of a memory processor.

FIG. 9 illustrates an example of a memory processor. Referring to FIG. 9, a memory processor 120 may include a processing unit 910 and a plurality of caches 920 and 930. The processing unit 910 may include a handler 911, a register file 912, and a plurality of registers 913, 914, 915, 916, 917. The handler 911 may perform operations related to data processing. The handler 911 may be configured in hardware logic, or software that may process events transmitted from a hardware core and host processors 110A, 110B, 110C, 110D (see FIG. 1) in the hardware core.

The memory processor 120 may further include a communication module 901. The communication module may set data in at least one of the registers 913, 914, 915, 916, 917 in response to the events transmitted from the host processors 110A, 110B, 110C, and 110D. In response to the handler 911 identifying the set data and processing the corresponding event in response to data setting by the communication module 901, the communication module 901 may transmit the event processing result of the handler 911 to the host processors 110A, 110B, 110C, 110D. Hereinafter, for convenience of explanation the operations of the communication module 901 are described as being performed by the memory processor 120.

The registers 913, 914, 915, 916, 917 may include a processor ID (PID) register 913, a data register (DR) 914, an address register (AR) 915, a cache state register (CSR) 916, and an event notification register (ENR) 917.

The handler 911 may read the PID register 913 to identify an ID of a processor that generates an event.

The handler 911 may read the DR 914 to identify data of a cache line. For example, the cache line stored in the DR 914 may be a victim cache line with respect to an overflow event, and/or a cache line that is requested with respect to a cache_miss event.

The handler 911 may read the AR 915 to identify an address of a victim cache line according to an overflow event. The AR 915 may include an address of a cache line that detects a conflict according to a conflict_detection event.

The handler 911 may read the CSR 916 to store the state (for example, an MESI state) of a cache line. For example, the CSR 916 may include the states of a cache provided from the host processor 110A with respect to the cache_miss event.

The ENR 917 may be used to notify the host processor 110A of operation completion. As the handler 911 is able to set the ENR 917 to an appropriate value according to a processed event upon completion of event processing, the ENR 917 may be used at all times for notification of completion of event processing to the host processor 110A.

Figure 10:
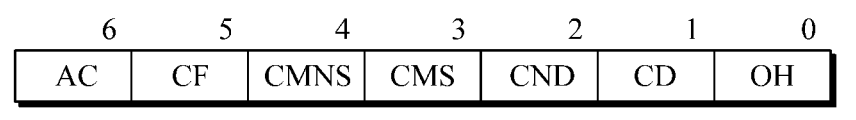

FIG. 10 illustrates an example of an event notification register (ENR).

The ENR may include an overflow handled (OH) bit, a conflict detected (CD) bit, a conflict non detected (CND) bit, a cache miss supplied (CMS) bit, a cache miss not supplied (CMNS) bit, a commit finished (CF) bit, and an abort completed (AC) bit.

Once a handler 911 sets a bit, a processing unit 910 of a memory processor 120 may perform an operation according to the set bit. For example, in response to the processing unit 910 acquiring a CMS bit, the memory processor 120 may provide a cache line to a requesting processor.

A register may be used for all events for an appropriate purpose. Hereinafter, it may be presumed for convenience of explanation that a host processor 110A (see FIG. 1) requests a transaction event. The host processor 110A may transmit an event signal in an appropriate data form to the memory processor 120 to request assistance from the memory processor 120.

An abort_transaction event may be used when the host processor 110A needs to abort a transaction and has a cache line overflowed during the transaction. The PID register 913 and the ENR 917 may be used for the abort_transaction event. In response to receiving the abort_transaction event, the memory processor 120 may read a PID of the host processor 110A included in the abort_transaction event, and may set the PID register 913 according to the read PID. Then, the handler 911 may invalidate a hash table corresponding to the PID of the host processor 110A that requests the abort_transaction event. After processing the abort_transaction event, the handler 911 may set an AC bit of the ENR 917, and the memory processor 120 may notify the host processor 110A of the completion of processing the abort_transaction event.

The PID register 913, the DR 914, the AR 915, the CSR 916, and the ENR 917 may be used for a cache_miss event. The host processor 110A may transmit to the memory processor 120 its PID and the cache_miss event that may include an address at which a cache miss occurs. The memory processor 120 may receive the PID of the host processor 110A and the cache_miss event. Then, the memory processor 120 may identify the PID and the AR to determine which processor sent the request and at which address the cache miss occurs, and may set the PID register 913 and the AR 915 according to the determination result. In response, the handler 911 may search a hash table corresponding to the host processor 110A that requests the event processing for an address. In response to the address being found in the hash table corresponding to the host processor 110A, the handler 911 may set the DR 914 to the data corresponding to the address and the CSR 916 to the state information of the data. Thereafter, the handler 911 may set the CMS bit of the ENR 917, and the memory processor 120 may transmit information about a missing address set in the DR 914 to the host processor 110A.

In response to a cache line corresponding to the missing address not being found in the hash table, the handler 911 may set the CMNS bit, and the memory processor may notify the host processor 110A that the cache line corresponding to the missing address is not found using the set CMNS bit. The host processor 110A may process a cache miss by requesting the memory 130 to send the data corresponding to the missing address and receiving the data.

The PID register 913 and the ENR 917 may be used for the commit_transaction event, similar to the abort_transaction event. The commit_transaction event may be to request the handler 911 to flush contents of a corresponding hash table to the memory 130. In response to receiving the commit_transaction event, the memory processor 120 may read a PID from the commit_transaction event and may set the PID register 913 to the read PID. The handler 911 identifies a PID of the host processor 110A from the PID register 913, and flushes the contents of the hash table corresponding to the host processor 110A to the memory 130. That is, the data stored in the hash table may be visible to the other host processors 110B, 110C, 110D (see FIG. 1). The handler 911 may set a CF bit of the ENR 917. The memory processor 120 may learn the completion of the commit_transaction from the set CF bit, and then may notify the host processor 110A.

The PID register 913, the AR 915, the CSR 916, and the ENR 917 may be used for a conflict_detection event. In response to receiving the conflict_detection event, the memory processor 120 may read a PID, an address at which the conflict_detection event occurs, and a access request (read/write) from the conflict_detection event; and may set the PID register 913, the AR 914, and the CSR 916, respectively, according to the read results. For example, cache state information set in the CSR 916 may be used to identify not a state of a cache line, but whether a snooping request is a read request or a write request. Then, the handler 911 may use information set in the respective PID register 913, AR 914, and CSR 916 to examine a relevant cache line of a hash table corresponding to the host processor 110A. In response to the cache line which corresponds to the AR 914 and is read from the event message being found in the hash table, the handler 911 may check conflict conditions. The conflict conditions may be satisfied by the cache being in a modified state and by the request being a read request, or the cache line being found and the request being a write request. If a conflict is detected, the handler 911 may set the CD bit in the ENR 917. If the conflict is not detected, the handler 911 may sey the CND bit in the ENR 917.

The memory processor 120 may transmit the result of conflict detection to the host processor 110A that requested the conflict detection. The host processor 110A may either resolve the conflict or ignore a request for snooping. The conflict_detection event may be transmitted to the memory processor 120 from the host processor 110A each time another host processor 110B, 110C, 110D issues an access request for an address which is mapped to an overflowed cache set of the host processor 110A.

The memory processor 120 may snoop a conflict_detection event and may determine whether conditions for conflict detection are satisfied based on a global hash table to optimize processing of the conflict_detection event. In response to a conflict being detected, the memory processor 120 may immediately request the host processor 110B, which requested the access, to abort the transaction.

All registers (that is, the PID register 913, the DR 914, the AR 915, the CSR 916, and the ENR 917) may be used for an overflow event. The host processor 110A may generate an overflow event that may include data of a victim cache line. The handler 911 of the memory processor 120 may receive the overflow event; read a PID of the host processor 110A that has transmitted the overflow event, overflow data, an overflowed address, and cache state information; and set the PID register 913, the DR 914, the AR 915, and the CSR 916, respectively, according to the pieces of data read from the overflow event. The handler 911 may write the data set in the respective PID register 913, DR 914, AR 915, and CSR 916 in entries of a hash table corresponding to the PID of the host processor 110A. The written data may be used to process other events.

Once the handler 911 stores the data in the hash table corresponding to the host processor 110A according to the overflow event processing, the handler 911 may set the OH bit in the ENR 917. The memory processor 120 may notify the host processor 110A that the overflowed cache line is safely stored in response to the memory processor 120 confirming that the OH bit is set.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An unbounded transactional memory system, comprising:
a host processor comprising:
an execution unit configured to perform a transaction; and
a cache configured to temporarily store data;
a memory; and
a memory processor configured to store overflow data in overflow storage included in the memory in response to an overflow event in which the overflow data is generated in the cache during the transaction,
wherein the cache comprises a plurality of cache sets, each cache set comprising a plurality of cache lines, each cache line comprising a T bit configured to indicate whether the cache line is accessed by a transaction, each cache set comprising an O bit configured to indicate whether the cache set has overflowed.

2. The unbounded transactional memory system of claim 1, wherein, in response to data generated by a transaction being greater than a size of a cache set to store the data, the host processor is configured to:
generate an overflow event;
set an O bit in the cache set; and
transmit the overflow event to the memory processor to inform of the occurrence of the overflow event.

3. The unbounded transactional memory system of claim 1, wherein the host processor further comprises a transaction counter register configured to indicate a number of nested transactions.

4. The unbounded transactional memory system of claim 1, wherein the host processor further comprises a register check point register configured to store data that has been previously generated during execution of previous instructions before a transaction_begin instruction, in response to the host processor executing the transaction_begin instruction.

5. The unbounded transactional memory system of claim 1, wherein:
in response to the host processor comprising the cache set with an O bit set therein performing the transaction that causes the overflow event and a different host processor requesting data from the memory in its own transaction, the host processor is configured to generate a conflict_detection event; and
the memory processor is further configured to determine whether an address of the requested data is stored in the overflow storage, in response to the conflict_detection event.

6. The unbounded transactional memory system of claim 1, wherein:
in response to a cache miss occurring in the host processor comprising the cache set with an O bit set therein while the transaction that causes the overflow event is performed, the host processor is configured to generate a cache_miss event; and
the memory processor is further configured to determine whether data of an address at which the cache miss occurs is stored in the overflow storage, in response to the cache_miss event.

7. The unbounded transactional memory system of claim 1, wherein the memory processor comprises:
a handler configured to process an event received from the host processor; and
a plurality of registers configured to be set for processing the event, the plurality of registers comprising:
a processor identification register;
a data register;
an address register;
a cache state register; and
an event notification register.

8. The unbounded transactional memory system of claim 1, wherein the overflow storage comprises a hash table corresponding to the host processor, the hash table configured to store the overflow data in a storage space indexed by a value hashed from an address of the overflow data.

9. The unbounded transactional memory system of claim 1, wherein, in response to a plurality of host processors being present, the overflow storage comprises a global hash table configured to store overflow data of the respective host processors using processor IDs of the respective host processors.

10. An unbounded transactional memory system, comprising:
a host processor comprising:
an execution unit configured to perform a transaction; and
a cache configured to temporarily store data;
a memory; and
a memory processor configured to store overflow data in overflow storage included in the memory in response to an overflow event in which the overflow data is generated in the cache during the transaction, wherein:
in response to the transaction that causes the overflow event being aborted, the host processor is configured to generate an abort_transaction event; and
the memory processor is further configured to invalidate the overflow data from the overflow storage in response to the abort_transaction event.

11. The unbounded transactional memory system of claim 10, wherein:
in response to the transaction that causes the overflow event being committed, the host processor is configured to generate a commit_transaction event; and
the memory processor is further configured to flush the overflow data to the memory in response to the commit_transaction event.

12. A method of operating a unbounded transactional memo system comprising a host processor comprising an execution unit to perform a transaction and a cache to temporarily store data, a memory, and a memory processor interposed between the host processor and the memory, the method comprising:
generating an overflow event in response to data being overflowed in the cache of the host processor that is performing the transaction; and
in response to the overflow event, storing the overflow data in overflow storage included in the memory using the memory processor,
wherein the cache comprises a plurality of cache sets, each cache set comprising a plurality of cache lines, each cache line comprising a T bit indicating whether the cache line is accessed by a transaction, each cache set comprising an O bit indicating whether the cache set has been overflowed.

13. The method of claim 12, wherein the generating of the overflow event comprises:
in response to data generated by a transaction being greater than a size of a cache set to store the data:
generating the overflow event; and
setting an O bit in the cache set; and
transmitting the overflow event to the memory processor to inform of the occurrence of the overflow event.

14. The method of claim 12, further comprising:
in response to the host processor executing the transaction_begin instruction, storing data that has been previously generated during execution of previous instructions before a transaction_begin instruction in a register check point register included in the host processor.

15. The method of claim 12, further comprising:

in response to the host processor comprising the cache set with an O bit set therein performing the transaction that causes the overflow event and a different host processor requesting data from the memory in its own transaction, generating a conflict_detection event at the host processor;

determining, at the memory processor, whether an address of the requested data is stored in the overflow storage, in response to the conflict_detection event; and transmitting the determination result from the memory processor to the host processor.

16. The method of claim 12, further comprising:

in response to a cache miss occurring in the host processor comprising the cache set with an O bit set therein while the transaction that causes the overflow event is performed, generating a cache_miss event at the host processor;

determining, at the memory processor, whether data of an address at which the cache miss occurs is stored in the overflow storage, in response to the cache_miss event; and transmitting the determination result from the memory processor to the host processor.

17. A method of operating a unbounded transactional system comprising a host processor comprising an execution unit to perform a transaction and a cache to temporarily store data, a memory, and a memory processor interposed between the host processor and the memory, the method comprising:

generating an overflow event in response to data being overflowed in the cache of the host processor that is performing the transaction;

in response to the overflow event, storing the overflow data in overflow storage included in the memory using the memory processor;

generating, at the host processor, an abort_transaction event in response to the transaction that causes the overflow event being aborted; and invalidating, at the memory processor, the overflow data from the overflow storage in response to the abort_transaction event.

18. The method of claim 17, further comprising:

generating, at the host processor, a commit_transaction event in response to the transaction that causes the overflow event being committed; and flushing, at the memory processor, the overflow data to the memory in response to the commit_transaction event.

* * * * *